(12) United States Patent
Borsoi et al.

(10) Patent No.: US 10,234,323 B2
(45) Date of Patent: Mar. 19, 2019

(54) METHOD FOR DETERMINING A LIQUID LEVEL AND QUALITY IN A TANK

(71) Applicant: Continental Automotive GmbH, Hannover (DE)

(72) Inventors: Sonny Borsoi, Thionville (FR); Mathieu Dupriez, Les Etangs (FR)

(73) Assignee: Continental Automotive GmbH, Hannover (DE)

( * ) Notice: Subject to any disclaimer, the term of this patent is extended or adjusted under 35 U.S.C. 154(b) by 174 days.

(21) Appl. No.: 15/319,659

(22) PCT Filed: Jun. 25, 2015

(86) PCT No.: PCT/EP2015/064453
§ 371 (c)(1),
(2) Date: Dec. 16, 2016

(87) PCT Pub. No.: WO2015/197792
PCT Pub. Date: Dec. 30, 2015

(65) Prior Publication Data
US 2017/0184438 A1    Jun. 29, 2017

(30) Foreign Application Priority Data

Jun. 26, 2014 (EP) .................................... 14290185

(51) Int. Cl.
*G01F 23/296* (2006.01)
*G01F 23/00* (2006.01)

(52) U.S. Cl.
CPC ...... *G01F 23/2962* (2013.01); *G01F 23/0069* (2013.01); *G01F 23/296* (2013.01)

(58) Field of Classification Search
CPC .................................................. G01F 23/2962
See application file for complete search history.

(56) References Cited

U.S. PATENT DOCUMENTS

| 6,082,181 A * | 7/2000 | Greenwood ........... G01N 9/002 73/1.03 |
| 6,786,090 B2 * | 9/2004 | Benghezal .......... G01F 23/2962 340/621 |
| 6,993,967 B2 * | 2/2006 | Forgue ................ G01F 23/2962 73/1.82 |

(Continued)

FOREIGN PATENT DOCUMENTS

| DE | 3706453 A1 | 9/1988 |
| DE | 19533875 A1 | 3/1997 |

(Continued)

OTHER PUBLICATIONS

International Search Report and Written Opinion dated Sep. 29, 2015 from corresponding International Patent Application No. PCT/EP2015/064453.

*Primary Examiner* — Paul M. West
*Assistant Examiner* — Mark A Shabman

(57) ABSTRACT

A method for determining a liquid level in a tank of a vehicle uses an ultrasonic sensor for emitting and receiving ultrasonic waves. Basically the liquid level is determined based upon measuring the transition time of an ultrasonic wave emitted by the ultrasonic sensor, wherein the emitted wave is deflected two times before being reflected by the surface of the liquid contained in the tank.

16 Claims, 2 Drawing Sheets

(56) References Cited

U.S. PATENT DOCUMENTS

Figure 1:
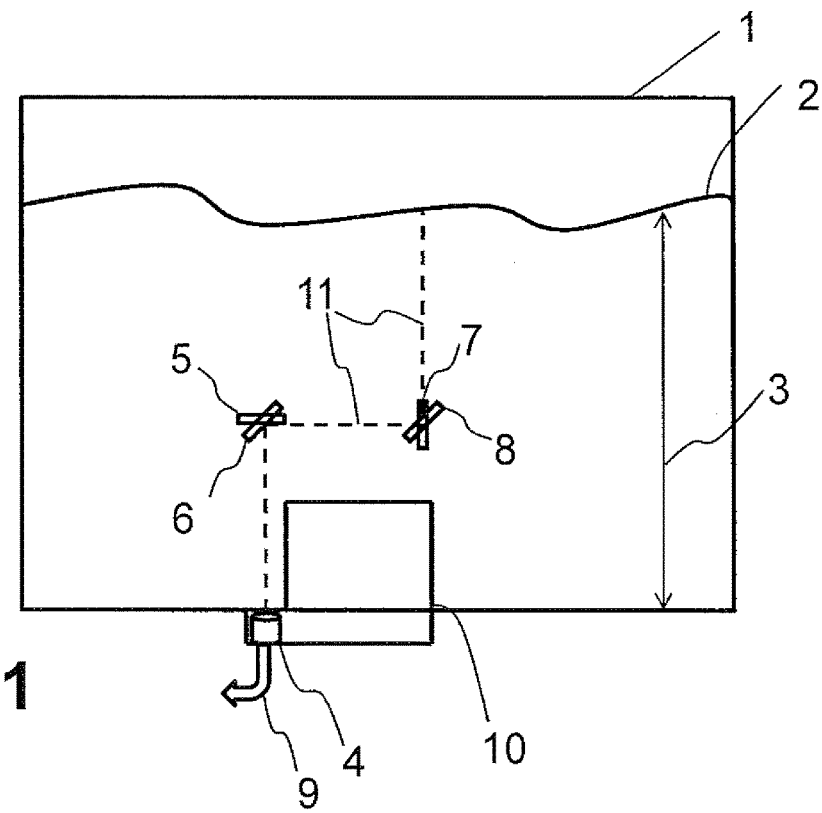

| | | | |
|---|---|---|---|
| 8,720,274 B2* | 5/2014 | Nongaillard | G01N 29/022 73/649 |
| 2010/0018309 A1* | 1/2010 | Marcovecchio | G01F 23/2962 73/290 V |
| 2016/0216149 A1* | 7/2016 | Bauer | G01F 23/296 |

FOREIGN PATENT DOCUMENTS

| | | |
|---|---|---|
| DE | 102004028547 A1 | 2/2006 |
| DE | 102011089685 A1 | 6/2013 |
| WO | 2008/101339 A1 | 8/2008 |
| WO | 2013/127804 A1 | 9/2013 |

* cited by examiner

METHOD FOR DETERMINING A LIQUID LEVEL AND QUALITY IN A TANK

The invention relates to a method for determining the liquid level and quality in a tank for a liquid. The method can be particularly used for determining the liquid level in a tank of a motor vehicle, said tank containing a liquid additive for exhaust gas cleaning.

Motor vehicles with exhaust gas treatment devices, in which a liquid additive for exhaust gas cleaning is added, are widely used. Exhaust gas treatment devices, in which the method of selective catalytic reduction (SCR method, SCR=Selective Catalytic Reduction) is performed, are encountered particularly frequently. With this method nitrogen oxide compounds in the exhaust gas with ammonia are reduced to harmless substances such as nitrogen, water and $CO_2$. Usually ammonia itself is not stored in a motor vehicle, but is stored as a liquid additive in a tank comprised in the vehicle. Such a liquid additive for exhaust gas cleaning is then converted to ammonia outside the exhaust gas in a reactor provided for that purpose or within the exhaust gas in an exhaust gas treatment device. Particularly frequently, a urea-water solution can be used as the liquid additive. A urea-water solution with a urea percentage of 32.5% by weight is available under the trademark AdBlue®. In the following such liquids are referred to as urea liquid.

It is frequently necessary to obtain information about the liquid level in a tank for liquid additive. Information about the level can be used to determine suitable points in time for filling the tank. Moreover, it can be prevented that the tank is completely emptied during operation.

Ultrasonic level sensors have already been proposed for determining the level in a tank for liquid additive. Ultrasonic level sensors typically comprise an ultrasonic emission unit and an ultrasonic receiving unit. The ultrasonic emission unit emits an ultrasonic wave, which is reflected at a liquid surface within the tank and from there returns to the ultrasonic level sensor, where it is received by the ultrasonic receiving unit of the ultrasonic sensor. The propagation speed of the ultrasonic wave in the liquid is either known or can be determined with a reference measurement. The level in the tank is computed from the transition time of the ultrasonic wave from the ultrasonic sensor to the liquid level and back to the ultrasonic sensor and the propagation speed of the ultrasonic wave in the liquid.

An advantage of ultrasonic level sensors is the absence of any movable parts. Moreover, with ultrasonic level sensors it is possible to measure the level in a tank with the same sensor design even for different tank heights. Differences with regard to the possible level in the tank only have to be stored in an evaluation unit with which the ultrasonic waves received by the ultrasonic receiving unit are evaluated. Ultrasonic waves received by the ultrasonic receiving unit, which originate from the ultrasonic waves emitted by the ultrasonic emission unit and have been e.g. reflected at the liquid surface, are also referred to below as signals or as response signals, which are received by the ultrasonic receiving unit or by the ultrasonic level sensor.

A plurality of arrangements of ultrasonic level sensors in tanks are known. According to a known arrangement, ultrasonic waves are emitted from a point located above the liquid level downwards to the liquid level in the tank. The ultrasonic waves are reflected by the surface of the liquid back to the ultrasonic level sensor. In an alternative arrangement an ultrasonic level sensor is arranged at the bottom of the tank to emit an ultrasonic wave upwards through the liquid to the liquid surface where it is reflected thus travelling back to the ultrasonic sensor.

As explicated above a reference measurement can be conducted for determining the propagation speed of ultrasonic waves in a liquid. It is basically known to determine the propagation speed by measuring the time needed by an ultrasonic wave for travelling a distance of known length, i.e. a reference distance.

A measuring distance can e.g. be implemented with at least one reflecting reference surface at which the ultrasonic wave is reflected. Preferably, the position of the reference surface or the distance between two reference surfaces is accurately known.

When conducting such a reference measurement the measuring distance must be disposed fully within the liquid. This may become problematic with changing levels and filling heights of the liquid in the tank. It is therefore known to arrange the measuring distance for determining the propagation speed horizontally, preferably close to the bottom of the tank. This enables to conduct the reference measurement even for very low liquid levels. However, a disadvantage of a horizontal arrangement of a measuring distance requires a comparatively large installation space at the bottom of the tank.

It is an object of the present invention to solve or at least to alleviate above described technical problems. In other words an advantageous method for determining the liquid level in a tank using an ultrasonic sensor is presented.

This is achieved at least partially with a method according to claim 1. Other advantageous embodiments of the method are specified in the dependent claims. The features individually mentioned in the claims can be combined with each other in any technically meaningful manner and can be accompanied by explanatory facts from the description, wherein other embodiment variants of the method are presented.

The invention relates to a method for determining the liquid level in a tank using an ultrasonic sensor capable of emitting and receiving an ultrasonic wave, a first reflector arranged vertically above the ultrasonic sensor for reflecting an ultrasonic wave emitted from the ultrasonic sensor back to the ultrasonic sensor, and a second, third and fourth reflector arranged above the ultrasonic sensor and arranged below the first reflector, said second reflector arranged vertically above the ultrasonic sensor to deflect an ultrasonic wave emitted by the ultrasonic sensor to said third and said fourth reflector arranged at the same distance from said second reflector, and wherein the third reflector is arranged to reflect an ultrasonic wave incoming from the second reflector back to said second reflector, and wherein the fourth reflector is arranged to reflect an ultrasonic wave incoming from the second reflector to the liquid level, wherein the method comprises at least the steps of:

a) determining a first transition time of an ultrasonic wave between the ultrasonic sensor and the first reflector, and b) determining a propagation speed of an ultrasonic wave in the liquid for the distance from the ultrasonic sensor via the second reflector to the third reflector, and c) determining a second transition time of an ultrasonic wave for the distance from the ultrasonic sensor via the second and fourth reflector to the liquid level, and d) calculating a liquid level based on the determined propagation speed of an ultrasonic wave in the liquid and based on the second determined transition time.

The ultrasonic sensor is preferably arranged at the bottom of the tank or close to the bottom of the tank. The ultrasonic sensor is arranged so that it is capable of emitting ultrasonic waves vertically upwards and for receiving ultrasonic waves incoming from a vertical upward direction, i.e. from a location arranged above the ultrasonic sensor. In this way the ultrasonic sensor is arranged to emit ultrasonic waves in a vertically upward direction, so the waves may pass the bottom wall of the tank, may travel through the liquid and may be reflected and deflected by reflectors arranged above the ultrasonic sensor. The ultrasonic sensor may be arranged to receive reflections of emitted ultrasonic waves, i.e. the ultrasonic sensor acts as an emitter and a receiver for ultrasonic waves, wherein the reflections may be the ultrasonic waves emitted by the ultrasonic sensor and reflected by one of the reflectors and/or the liquid surface.

The first reflector preferably can be arranged vertically above the ultrasonic sensor, wherein the first reflector is arranged to reflect a vertically travelling ultrasonic wave directly to the ultrasonic sensor, i.e. the reflected ultrasonic wave propagates downwards from the first reflector to the ultrasonic sensor.

In a vertical orientation, the second and third reflectors are arranged between the ultrasonic sensor and the first reflector, i.e. below the first reflector and above the ultrasonic sensor. In particular the second reflector is arranged vertically above the ultrasonic sensor to deflect a wave emitted by the ultrasonic sensor to a horizontal direction and to the third reflector. The third reflector essentially is arranged on the same horizontal level as the second reflector and is furthermore arranged to sight the second reflector in order to reflect an ultrasonic wave reflected by the second reflector back to said second reflector that in turn will deflect the reflected ultrasonic wave to the ultrasonic sensor. A vertically propagating wave originating from the ultrasonic sensor in this way may be deflected by an angle of 90° to a horizontal propagation direction, i.e. into the direction of the third reflector that in turn reflects the ultrasonic wave by 180°, i.e. reverses the direction of travelling. Said reflected wave is then again deflected by the second reflector thus travelling back to the ultrasonic sensor. The reference distance is defined between ultrasonic sensor and the third reference.

The arrangement of the second and third reflector below the first reflector ensures that a wave emitted by the ultrasonic sensor travels through liquid only, i.e. is not deflected and/or reflected by the liquid surface, as long the first reflector is covered by the liquid contained in the tank. Since the geometrics of the arrangement are known to the evaluating processing device, the travelling distance from the ultrasonic sensor via the second reflector to the third reflector may serve as a reference distance for determining the propagation speed of an ultrasonic wave in the liquid.

The second reflector is furthermore arranged to deflect an ultrasonic wave as emitted by the ultrasonic sensor to the fourth reflector, i.e. the second reflector not only deflects the vertically travelling ultrasonic wave from the ultrasonic sensor to the third reflector but also to the fourth reflector. The ultrasonic wave as deflected by the second reflector thus propagates horizontally to the third and to the fourth reflector. Note that in one embodiment the horizontal distances from the second reflector to the third reflector and from the second reflector to the fourth reflector can be identical. In one particular embodiment, the third and fourth reflector can be arranged abutting, i.e. very close to each other and in particular can be mounted to the same holding.

According to another arrangement, the distances from the second to the third and from the second to the fourth reflector may differ, wherein both distances are known to the system, so both distances can be considered when evaluating when computing the propagation speed and the liquid level respectively.

The fourth reflector is arranged to deflect an ultrasonic wave to the liquid level, i.e. the fourth reflector is arranged to deflect a horizontally travelling ultrasonic wave as deflected by the second reflector to a vertical direction, i.e. to an upwards vertical direction. The ultrasonic wave as deflected by the fourth reflector thus propagates vertically upwards to the liquid level where it is reflected. The reflection of the ultrasonic wave at the surface of the liquid reverses the propagation direction of the ultrasonic wave, i.e. the direction of the vertically upwards travelling ultrasonic wave is reversed to a vertically downward travelling direction so the ultrasonic wave will return to the fourth reflector, where it is deflected to a horizontal direction towards the second reflector that in turn deflects the ultrasonic wave to a vertical direction towards the ultrasonic sensor. A vertically travelling ultrasonic wave emitted by the ultrasonic sensor thus can be initially deflected by the second reflector to a horizontal direction, then by the fourth reflector to a vertically upwards travelling direction until it hits the liquid level, i.e. the surface of the liquid from underneath, wherein the liquid surface reverses the travelling direction so the ultrasonic wave in the end arrives at the ultrasonic sensor via the fourth and second reflector.

The method for determining the liquid level in the tank may comprise the step of emitting an ultrasonic wave by the ultrasonic sensor in an essentially vertically upwards direction to the first reflector, which is arranged essentially vertically above the ultrasonic sensor for reflecting said ultrasonic wave back to the ultrasonic sensor, i.e. the first reflector reverses the propagation direction of an incoming ultrasonic wave. The ultrasonic sensor thus receives the incoming ultrasonic wave as reflected by the first reflector and measures the time span needed by the ultrasonic wave for travelling from the ultrasonic sensor to the first reflector and back. The measured time can be compared to a predefined reference time. In case the measured time is outside a predefined time window, the method aborts, since the system assumes that the emitted ultrasonic wave has not been reflected by the first reflector, but by the surface of the liquid. In other words if the measured travelling time of the wave is shorter than a predefined duration, then the system assumes that the liquid level is below the first reflector. Consequently, since it is unclear whether the liquid covers the second to fourth reflector, the method for determining the exact liquid level is aborted. The system may accordingly conclude and provide a corresponding signal to a connected processing system, i.e. a controller, that the liquid level is below the threshold, i.e. the tank should be refilled.

In case the measured time span is inside the predefined time window then the method may proceed. Note that the ultrasonic sensor may emit one or a plurality of ultrasonic waves for conducting the method steps. In one preferred embodiment the system emits one ultrasonic wave and subsequently performs all method steps based on reflections of said single emitted wave.

As described above the ultrasonic sensor will receive a second reflection of the emitted ultrasonic wave, i.e. the wave that has been deflected by the second and third reflector. The ultrasonic sensor may measure the time span between emission of the ultrasonic wave and receiving of the second reflection, i.e. a second transition time. Based on the second transition time and the travelling distance of said second reflection, i.e. the distance from the ultrasonic sensor via the second reflector to the third reflector, the system may compute the propagation speed of the ultrasonic wave in the liquid, i.e. the speed of sound of the wave in the liquid.

Based on the computed propagation speed the concentration of the urea liquid in the tank can be computed as explicated in more detail below. Information regarding concentration of urea liquid can be used as information regarding quality of urea liquid.

The ultrasonic sensor will furthermore receive a third reflection of the emitted wave, i.e. the wave travelling via the second and fourth deflector to the liquid surface, where it is reflected thus travelling back via the fourth and second deflector to the ultrasonic sensor. Similar as for the first and second reflections, the sensor measures the time span between emission of the ultrasonic wave and receiving the third reflection, i.e. the sensor measures a third transition time. Based on the measured third transition time and the computed propagation speed, the system may also compute the liquid level in the tank.

The liquid level is determined based upon measuring the transition time of an ultrasonic wave emitted by the ultrasonic sensor, wherein said emitted wave is deflected (at least or exactly) two times before being reflected by the surface of the liquid contained in the tank.

The described method and arrangement enables reliable determination of the liquid level in the tank, wherein an exact value of the liquid level can be determined in case the liquid level is above the first reflector. Otherwise the method may provide the information that the liquid level has dropped below the first reflector. While the method enables an exact determination of the liquid level, the described arrangement requires a comparatively small amount of space at the bottom of the tank. Due to the horizontal alignment of the reference distance for measuring the propagation speed of the ultrasonic wave, said reference distance can be comparatively long thus yielding accurate measures.

The described method enables reliable determination of low levels in a tank while using a vertical arrangement of the ultrasonic level sensor in the tank. This significantly reduces the space requirement of the level sensor at the bottom of the tank. For example, the vertically arranged ultrasonic level sensor with the reference surfaces can be mounted in a small opening in a floor of the tank. In contrast, an ultrasonic level sensor with horizontally arranged reference surfaces requires a complex fitting and/or an opening in the bottom of the tank whose diameter is at least as large as the length of the measuring distance.

Furthermore the arrangement combines a vertical emission of an ultrasonic wave, thus requiring only a small amount of space, with a comparatively long reference distance, i.e. the horizontal distance between the ultrasonic sensor and third reflector.

The method is particularly advantageous if the ultrasonic sensor is disposed outside of the tank and an ultrasonic wave of the ultrasonic level sensor passes through a coupling layer before entering the liquid in the tank, wherein the coupling layer comprises a tank wall (especially a segment of the tank wall) and the transition time of the ultrasonic wave in the coupling layer is taken into account with a correction factor when computing the transition times.

The ultrasonic level sensor is preferably disposed outside a tank interior on a side of a tank wall opposite from the liquid. Preferably, the coupling layer comprises an acoustic coupling/transition means in addition to the tank wall that couples the ultrasonic level sensor to the tank wall so as to conduct ultrasound. The transition means can e.g. comprise a conductive paste or a conductive pad, which is disposed between the tank wall and the ultrasonic sensor. The ultrasonic waves normally have a different propagation speed within the coupling layer than in the liquid in the tank. Because the design of the coupling layer is known, the speed of the ultrasonic waves in the coupling layer can be computed and taken into account as a correction factor. Preferably, the time required by the ultrasonic waves to pass through the coupling layer is determined by experiment and stored in the form of the correction factor in a controller for carrying out the described method.

The method steps for determining the transition times can be repeated in iterations. The values determined for the transition times thus can be further processed, i.e. the values can be averaged or filtered etc. for example in a digital signal processor.

Furthermore the arrangement may comprise a means for digitizing the measured transition times and for providing the measured transition times to a digital signal processor, which can be an application specific integrated circuit (ASIC) or a general purpose CPU, wherein in one particular embodiment said digital signal processor may be a controller comprised in an automotive vehicle.

The described method can be repeated iteratively (during the operation of a motor vehicle), in order to always be able to provide current information about the liquid level in the tank. The parameters used and determined in the method can be stored in the controller comprised in the motor vehicle.

The method may further comprise the step of aborting the method in case the first transition time is outside a predefined time window.

The first, second, third and fourth reflectors are preferably arranged at predefined distances to the ultrasonic sensor. The second reflector and the fourth reflectors may deflect an ultrasonic wave by 90 degrees. The second reflector may be arranged to deflect an incoming ultrasonic wave to a horizontal orientation. The third reflector may be arranged to deflect an incoming ultrasonic wave to the second reflector. The fourth reflector may be arranged to deflect an incoming ultrasonic wave to a vertical upwards orientation.

A method embodiment is preferred, wherein the steps of measuring at least one transition time are repeated in a loop and wherein the measured transition times are averaged.

It is also preferred that the ultrasonic sensor is communicatively coupled to a digital signal processor configured for controlling at least ultrasonic sensor.

According to a further aspect, a motor vehicle comprising a tank for an operating liquid, in particular urea liquid, is proposed. Said motor vehicle further comprises:
an ultrasonic level sensor arranged at the bottom of the tank,
a first reflector arranged vertically above the ultrasonic sensor for reflecting an ultrasonic wave emitted from the ultrasonic sensor back to the ultrasonic sensor,
a second reflector, a third reflector and a fourth reflector arranged above the ultrasonic sensor and arranged below the first reflector,
said second reflector arranged vertically above the ultrasonic sensor to deflect an ultrasonic wave emitted by the ultrasonic sensor to said third reflector and said fourth reflector, and said third reflector and said fourth reflector arranged at the same distance from said second reflector,
wherein the third reflector is arranged to reflect an ultrasonic wave incoming from the second reflector back to said second reflector,
wherein the fourth reflector is arranged deflect an ultrasonic wave incoming from said second reflector to the liquid level, and at least one controller configured for level determination according to the method for determining a liquid level in a tank proposed herein.

Figure 3:
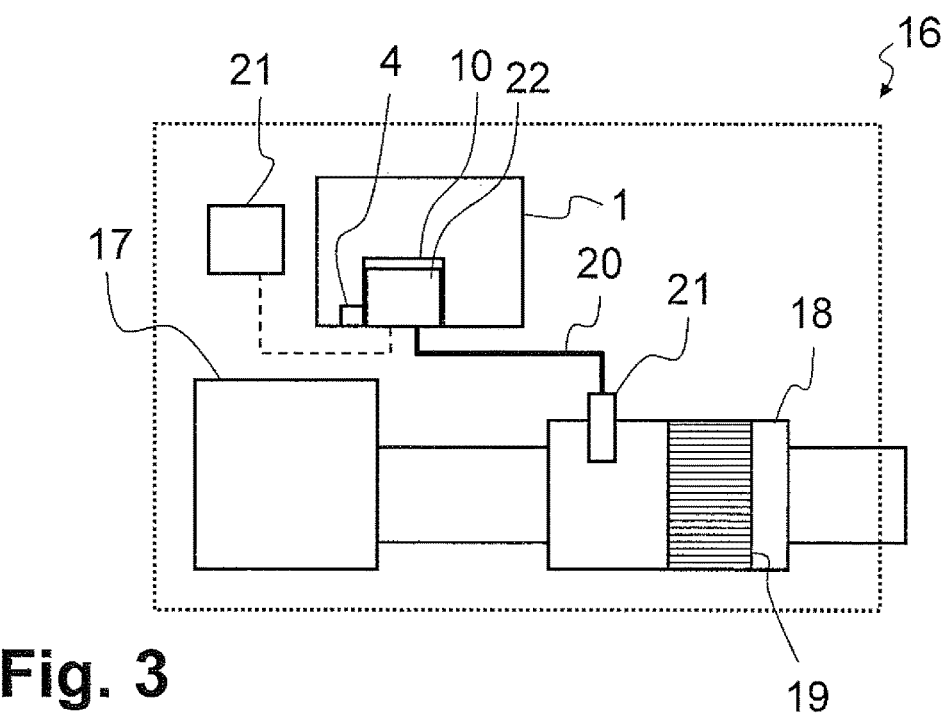
Figure 2:
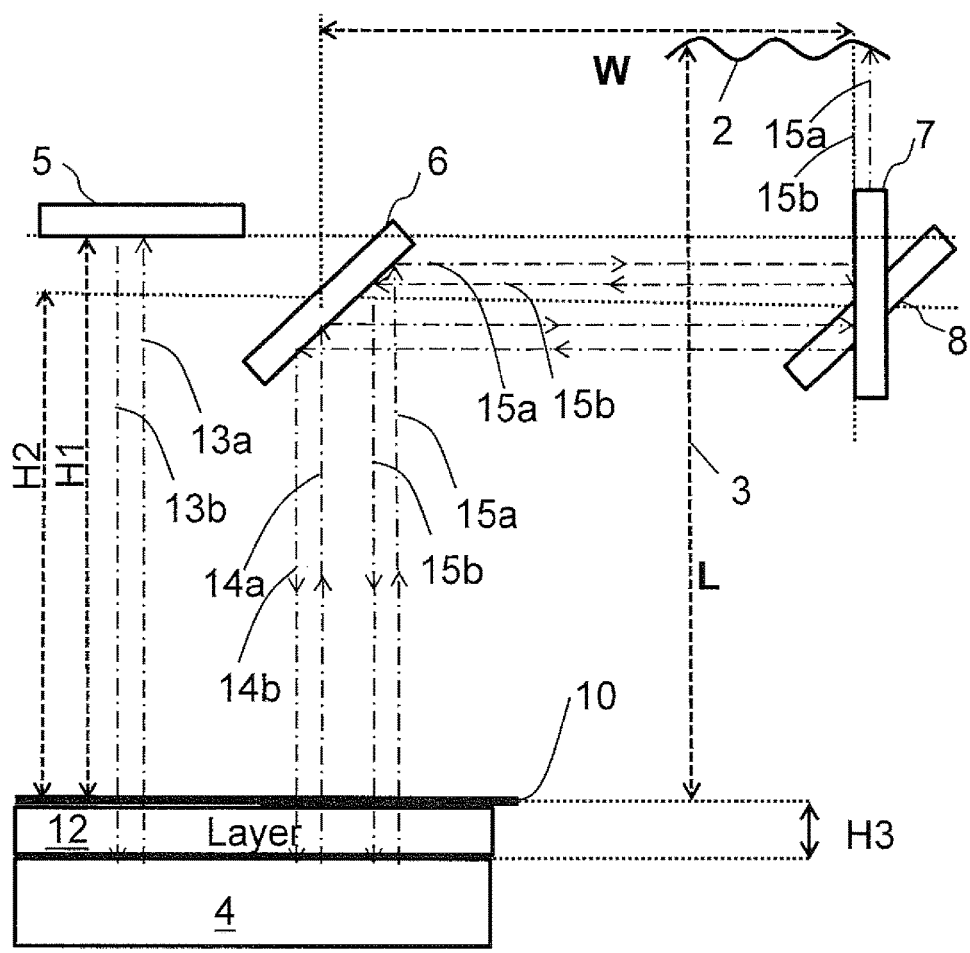

The invention and the technical environment are described in detail below with reference to the figures. The figures show particularly preferred exemplary embodiments, to which the invention is not limited, however. In particular, it is to be pointed out that the figures and the proportions represented in the figures are only schematic. In the figures:

FIG. 1: depicts a schematic of a tank comprising the described arrangement and containing a liquid, FIG. 2: depicts a schematic of the arrangement of an ultrasonic sensor and reflectors, FIG. 3: shows a motor vehicle comprising a tank and an ultrasonic level sensor, which can be operated according to the described method.

Note that the figures as described in the following are not scale. Rather the depicted tank and devices illustrate a basic arrangement of an embodiment. Accordingly, devices shown as blocks shall illustrate functional entities known a person skilled in the pertinent art. Consequently the figures shall illustrate but not limit the described method and arrangement. Furthermore, it is obvious that at least some of the technical features shown in the figures and/or explained (only) in connection with the figures can be extracted separately and can be combined with other features mentioned in the (general) specification and/or the claims.

FIG. 1 depicts a schematic of a tank 1 partially filled with a liquid 2, said liquid 2 being denoted by its surface. The distance 3 from the bottom of the tank to the liquid surface denotes the level of liquid contained in the tank, i.e. the liquid level. An ultrasonic sensor 4 is arranged outside of the liquid 2 contained in the tank, wherein first reflector 5, second reflector 6, third reflector 7 and fourth reflector 8 are arranged inside the tank. Depending on the liquid level, i.e. if the liquid level did not drop below the first reflector, all reflectors 5-8 are arranged within the liquid 2.

Ultrasonic sensor 4 can be a conventional device. Preferably ultrasonic sensor 4 is communicatively coupled to a digital signal processing entity, e.g. a controller comprised in an automotive vehicle, via a conventional wired or wireless communication connection 9. In one embodiment ultrasonic sensor 4 can be coupled via a CAN or ICAN or other bus system to a controller—not shown in FIG. 1—, which is adapted and configured to control ultrasonic sensor 4 and to compute the liquid level and concentration of the liquid based on the information, i.e. the transition times, provided by ultrasonic sensor 4.

In one embodiment ultrasonic sensor 4 can be an integral part of a pump comprised in a pump housing 10. Said pump housing 10 may be arranged inside of tank 1 or outside of the tank—not shown in the figure.

The controller may control ultrasonic sensor 4 to emit an ultrasonic wave 11 as illustrated by dashed line, wherein the emitted wave is deflected and reflected by reflectors 5-8 as described in more detail below with reference to FIG. 2.

FIG. 2 depicts a schematic diagram of a preferred arrangement, wherein ultrasonic sensor 4 is integrated in a (separately attachable) housing 10 (comprising in particular also a liquid pump) as illustrated in FIG. 1, wherein FIG. 2 depicts a sectional view of the arrangement. To enable the transition of ultrasonic waves 11 through the walls of the housing 10, ultrasonic sensor 4 optionally may be coupled via a coupling layer 12 to a wall of the housing 10 to enable the transition of ultrasonic waves 11 both in the upward and in the downward direction, thus enabling a wave as emitted by ultrasonic sensor 4 to vertically pass the housing wall in an upward direction to enter the liquid and to allow a vertically downwards travelling reflected ultrasonic wave 11 to pass the wall of housing 10 to (re-)enter ultrasonic sensor 4 for being detected by the sensor. Said coupling layer 12 thus effectuates an acoustic coupling of ultrasonic sensor 4 to the wall of housing 10.

Note that the thickness of the coupling layer 12, denoted as "H3" in the figure, including its properties regarding transition of ultrasonic waves, i.e. the influence of coupling layer 12 and housing wall 10 on ultrasonic wave propagation, are known in the system. Accordingly, that influence can be considered in the calculating (e.g. computing).

As illustrated, second reflector 6, third reflector 7 and fourth reflector 8 are arranged below first reflector 5. As a consequence second to fourth reflectors are arranged within the liquid, if first reflector 5 is covered by the liquid.

Furthermore note that "H1" denotes the distance from (the inner surface of the wall of) housing 10 to the (surface of) first reflector 5. This distance is known in the system, i.e. in the controller. "H2" denotes the distance from housing 10 to the (centre of) reflector 2. Note that in one embodiment the centre of third reflector 7 and fourth reflector 8 are aligned on the same horizontal level as second reflector 6, so vertical distance H2 also denotes the vertical height of third reflectors 7 and fourth reflector 8. The distance from the (centre of) second reflector 6 to the (centre of) third reflector 7 and fourth reflector 8 is denoted by "W". Note that third reflector 7 and fourth reflector 8 are aligned correspondingly.

Upon operation of the method, ultrasonic sensor 4 is controlled to emit an ultrasonic sound or wave in a vertical upwards direction. A first portion 13a of the emitted wave travels from ultrasonic sensor 4, i.e. from the oscillating piezo comprised in the sensor, to first reflector 5 where it is reflected by 180°, i.e. the direction of travel is reversed by the first reflector 5. Accordingly, the reflected ultrasonic wave 11 propagates vertically downwards to ultrasonic sensor 4 (see 13b), where it is detected. As described above ultrasonic sensor 4 is arranged to determine (in particular measure) the time span between emitting the wave and detecting its reflection, i.e. a first transition time is measured. The measured first transition time is then compared to a predefined time window. The predefined time window characterizes the minimum and maximum travelling time of an ultrasonic wave in the liquid. If the first transition time is outside time window, then the method assumes that the wave has not been reflected by the first reflector but by a liquid level that has dropped below the first reflector. In that case the method considers that the second to fourth reflector are not buried in liquid, thus all reflections of the ultrasonic wave cannot be evaluated. Consequently the method may be aborted and ultrasonic sensor 4 may provide a signal to the controller indicating that the liquid level has dropped below the first reference height H1.

Otherwise, i.e. if transition time exceeds the predefined time window, ultrasonic sensor 4 assumes that a second portion 14a of the emitted wave will travel via the second reflector 6 to the third reflector 7, where the propagation direction of the wave is reversed, thus a reflected wave portion 14b will be detected at ultrasonic sensor 4. Ultrasonic sensor 4 measures the time from emission of the wave until detection of the reflected portion 14b, i.e. transition time RT2.

Second wave portion 14a and its respective reflection 14b travelled through coupling layer 12. For computing the time needed by wave portion 14a, 14b to travel distances H2+W, a corrected transition time RT2 corrected is computed according to $$RT2\text{corrected} = RT2 - (2 \cdot H3/\text{SOSsandwich})$$

wherein H3 denotes the thickness of the so-called sandwich that the ultrasonic wave traverses, i.e. the housing wall of ultrasonic sensor 4, the thickness of coupling layer 12 and the thickness of the wall of housing 10. SOSsandwich specifies the Speed Of Sound in said layered sandwich, wherein said value can be determined as the travelling speed through plastics.

Based on the corrected transition time RT2 corrected the concentration of the urea liquid can be computed according to $$\text{Concentration} = (RT2\text{corrected} - (a2 \cdot T^2 + b2 \cdot T + c2))/(a1 \cdot T^2 + b1 \cdot T + c1)$$

wherein T is the temperature of the Urea liquid and a1, a2, b1, b2, c1 and c2 are coefficients without dimension known from testing.

Furthermore the propagation speed SoSurea of the ultrasonic wave in the liquid, e.g. in the urea liquid, can be determined based on the corrected transition time RT2 corrected and based on the known distances H2 and W according to $$\text{SoSurea} = 2(H2+W)/RT2\text{corrected}.$$

Finally ultrasonic sensor 4 receives a reflection of third wave portion 15a. Wave portion 15a of the emitted ultrasonic wave is deflected by second reflector 6 to a horizontal orientation and to the fourth reflector 8, which in turn deflects the wave from its horizontal orientation to a vertical upward orientation. Said deflected portion thus propagates towards the surface of the liquid 2 where it is reflected, i.e. the propagation orientation is reversed. Reflected third wave portion 15b travels vertically downward from the surface of the liquid 2 via fourth reflector 8 and second reflector 6 to ultrasonic sensor 4. Ultrasonic sensor accordingly detects reflected third wave portion 15b and measures the time span between emission of third wave portion 15a, 15b and detecting reflection, i.e. transition time RT3 is measured. Based on measured transition time RT3, the computed propagation speed of the ultrasonic wave in the liquid, the non-corrected transition time RT2 and distances H2 and W, the liquid level L can be computed according to $$L = (\text{SoSurea} \cdot (RT3 - RT2)/2) + H2$$

wherein L can also be seen as the distance from the upper surface of the bottom tank wall to the liquid surface, confer reference numeral 3 in FIGS. 1 and 2. The computation of L thus relies on the difference of the measured transition times RT3 and RT2, wherein both measured values are not corrected. The error introduced by traversing sandwich H3 thus is eliminated while at the same time reducing the computational efforts.

As indicated by wavy line, i.e. the line illustrating the surface of the liquid 2 contained in the tank, the surface of the liquid 2 may not be smooth while measuring distance "L". However, an error introduced by sloshing liquid averages out when repeating the steps of measuring the transition time RT3 and averaging the measured values. Accordingly, in one embodiment, the controller may repeat the step of measuring transition time RT3 in a loop, and then compute the average of the measured RT3. The step of calculating distance L can be based on the averaged value of RT3.

Note that for reducing measuring faults the steps for measuring transition times RT1 and RT2 can be repeated also.

In one embodiment, transition times RT1, RT2 and RT3 can be measured based on a single ultrasonic wave emission, since the described arrangement of the reflectors ensures that transition time RT1 is lower than RT2 that is lower than RT3, i.e. RT1<RT2<RT3. In an alternative embodiment of the described method the measurement of RT1 can be separated from measuring RT2 that can be separated from measuring RT3.

FIG. 3 depicts a schematic of a motor vehicle 16 comprising an internal combustion engine 17 and an exhaust treatment device 18 for cleaning exhaust gas emitted by combustion engine 17. An SCR catalyser 19 that enables cleaning exhaust gases of combustion engine 17 by using the method of selective catalytic reduction is disposed in the exhaust treatment device 18. A liquid additive for the exhaust gas cleaning can be delivered to the exhaust treatment device 18 by means of an injector 22. The liquid additive for the exhaust gas cleaning is provided from a tank 1 via a pipe 20 from a pump unit 23. Ultrasonic sensor 4 may be comprised in pump 10. Furthermore vehicle 16 may comprise controller 21 that is communicatively coupled to pump unit 10 and ultrasonic liquid level ultrasonic sensor 4. The method steps as described above may be stored as executable code in a digital signal processor i.e. a controller 21 entity comprised in motor vehicle 16.

REFERENCE SIGNS 1 tank
2 liquid
3 distance
4 ultrasonic sensor
5 first reflector
6 second reflector
7 third reflector
8 fourth reflector
9 communication connection
10 housing
11 ultrasonic wave
12 coupling layer
13 first wave portion
14 second wave portion
15 third wave portion
16 motor vehicle
17 internal combustion engine
18 exhaust treatment device
19 SCR catalyser
20 pipe
21 controller
22 injector
23 pump unit
H1 distance from housing 10 to the first reflector 5
H2 distance from housing 10 to the reflector 2
H3 thickness of the coupling layer
L liquid level
W distance from second reflector 6 to third reflector 7/fourth reflector 8

The invention claimed is:

1. A method for determining a liquid level in a tank for a liquid using an ultrasonic sensor arranged at the bottom of the tank for emitting and receiving an ultrasonic wave, and
a first reflector arranged vertically above the ultrasonic sensor for reflecting an ultrasonic wave emitted from the ultrasonic sensor back to the ultrasonic sensor, and a second, a third and a fourth reflector arranged above the ultrasonic sensor and arranged such that the respective centers of the second, third, and fourth reflectors are at a level that is lower than the first reflector, said second reflector arranged vertically above the ultrasonic sensor to deflect an ultrasonic wave emitted by the ultrasonic sensor to said third and said fourth reflector, and said respective centers of said third and said fourth reflector arranged at the same distance from said center of said second reflector, and wherein the third reflector is arranged to reflect an ultrasonic wave incoming from the second reflector back to said second reflector, and wherein the fourth reflector is arranged to deflect an ultrasonic wave incoming from said second reflector to the liquid level, the method comprising at least the following steps:

a) determining a first transition time of an ultrasonic wave between the ultrasonic sensor and the first reflector, and b) determining a propagation speed of an ultrasonic wave in the liquid based the distance from the ultrasonic sensor via the second reflector to the third reflector and based on a respective measured second transition time; and c) determining a third transition time of an ultrasonic wave for the distance from the ultrasonic sensor via the second and fourth reflector to the liquid level; and d) calculating a liquid level based on the determined propagation speed of an ultrasonic wave in the liquid and based on the second and third measured transition times.

2. The method according to claim 1, further comprising the step of aborting the method in the case that the first transition time does not exceed a predefined time window.

3. The method according to claim 1 wherein the reflectors are arranged at predefined distances to the ultrasonic sensor.

4. The method according to claim 1, wherein the second and the fourth reflectors deflect an ultrasonic wave by 90 degrees.

5. The method according to claim 1 wherein the second reflector is arranged to deflect an incoming vertically oriented ultrasonic wave to a horizontal orientation.

6. The method according to claim 1 wherein the third reflector is arranged to deflect an incoming ultrasonic wave to the second reflector and wherein the fourth reflector is arranged to deflect an incoming horizontally oriented ultrasonic wave to a vertical upwards orientation.

7. The method according to claim 1 wherein the step of measuring the third transition time is repeated in a loop and wherein the measured third transition times are averaged.

8. The method according to claim 1 wherein the ultrasonic sensor is communicatively coupled to a digital signal processor configured for controlling at least the ultrasonic sensor.

9. A motor vehicle comprising a tank for an operating liquid, further comprising an ultrasonic level sensor arranged at the bottom of the tank, and a first reflector arranged vertically above the ultrasonic sensor for reflecting an ultrasonic wave emitted from the ultrasonic sensor back to the ultrasonic sensor, and a second reflector, a third reflector and a fourth reflector arranged above the ultrasonic sensor and arranged such that the respective centers of the second, third, and fourth reflectors are at a level that is lower than the first reflector, said second reflector arranged vertically above the ultrasonic sensor to deflect an ultrasonic wave emitted by the ultrasonic sensor to said third reflector and said fourth reflector, and said respective centers of said third reflector and said fourth reflector arranged at the same distance from said center of said second reflector, and wherein the third reflector is arranged to reflect an ultrasonic wave incoming from the second reflector back to said second reflector, and wherein the fourth reflector is arranged deflect an ultrasonic wave incoming from said second reflector to the liquid level, and at least one controller configured for level determination via operations comprising:

a) determining a first transition time of an ultrasonic wave between the ultrasonic sensor and the first reflector, and b) determining a propagation speed of an ultrasonic wave in the liquid based the distance from the ultrasonic sensor via the second reflector to the third reflector and based on a respective measured second transition time; and c) determining a third transition time of an ultrasonic wave for the distance from the ultrasonic sensor via the second and fourth reflector to the liquid level; and d) calculating a liquid level based on the determined propagation speed of an ultrasonic wave in the liquid and based on the second and third measured transition times.

10. The motor vehicle according to claim 9, wherein the at least one controller is further configured for level determination via operations comprising: aborting level-determination operations in case the first transition time does not exceed a predefined time window.

11. The motor vehicle according to claim 9 wherein the reflectors are arranged at predefined distances to the ultrasonic sensor.

12. The motor vehicle according to claim 9, wherein the second and the fourth reflectors deflect an ultrasonic wave by 90 degrees.

13. The motor vehicle according to claim 9 wherein the second reflector is arranged to deflect an incoming vertically oriented ultrasonic wave to a horizontal orientation.

14. The motor vehicle according to claim 9 wherein the third reflector is arranged to deflect an incoming ultrasonic wave to the second reflector and wherein the fourth reflector is arranged to deflect an incoming horizontally oriented ultrasonic wave to a vertical upwards orientation.

15. The motor vehicle according to claim 9 wherein the operation of measuring the third transition time is repeated in a loop and wherein the measured third transition times are averaged.

16. The motor vehicle according to claim 9 wherein the ultrasonic sensor is communicatively coupled to a digital signal processor configured for controlling at least the ultrasonic sensor.

* * * * *